United States Patent [19]

Pershon

[11] Patent Number: 4,502,563
[45] Date of Patent: Mar. 5, 1985

[54] COLLAPSIBLE HORSE

[76] Inventor: Jacob A. Pershon, 47547 Fairchild, Mt. Clemens, Mich. 48045

[21] Appl. No.: 553,378

[22] Filed: Nov. 21, 1983

[51] Int. Cl.³ ............................................. F16M 11/00
[52] U.S. Cl. ..................................... 182/153; 182/181; 182/225; 248/166
[58] Field of Search ............... 182/153, 181, 182, 183, 182/184, 185, 224, 225; 248/166

[56] References Cited

U.S. PATENT DOCUMENTS

| | | | |
|---|---|---|---|
| 258,548 | 5/1882 | Blunt | 182/153 |
| 739,886 | 9/1903 | Loge et al. | 182/153 |
| 812,344 | 2/1906 | Howser | 182/153 |
| 1,509,717 | 9/1924 | Davis | 248/166 |
| 1,567,800 | 12/1925 | Getman | 182/153 |
| 2,325,592 | 8/1943 | Degler | 182/184 |
| 2,819,755 | 1/1958 | Berger | 182/181 |
| 2,900,158 | 8/1959 | Ditter | 248/166 |
| 3,148,746 | 9/1964 | Juculano | 182/153 |
| 3,527,434 | 9/1970 | Mauro | 248/166 |
| 3,704,849 | 12/1972 | Green | 182/181 |

FOREIGN PATENT DOCUMENTS 403271 7/1963 Switzerland ...................... 182/183

Primary Examiner—Reinaldo P. Machado
Attorney, Agent, or Firm—Basile, Weintraub & Hanlon

[57] ABSTRACT

A collapsible horse for supporting planks and the like wherein the collapsible horse comprises a stringer and laterally opposite, downwardly divergent extending legs which are carried at each end portion of the stringer. The stringer is in the form of two telescopically engaged tubular members with an inner tubular member having a length which exceeds the length of the first tubular member such that a pair of downwardly extending legs is attached to the longer member while a second pair of legs is attached to the shorter member. The two members are rotatable with respect to each other so that the legs may be extended and collapsed as desired.

2 Claims, 3 Drawing Figures

COLLAPSIBLE HORSE

BACKGROUND OF THE INVENTION

I. Field of the Invention

The present invention relates to horses of the type used for supporting lateral members, such as planks and the like, to provide an elevated platform, and the present invention refers more particularly to a horse of the type which is collapsible or foldable for storage and transportation.

II. Description of the Prior Art

The provision of telescoping horizontally extending support members, such as a stringer in a sawhorse, is known and is disclosed in U.S. Pat. No. 812,344 issued Feb. 13, 1906, to Howser. This patent discloses a support having two horizontal members that are telescopically arranged so as to vary the overall length of the support. Hollow sleeves are provided at the upper ends of a plurality of legs which are disposed around the ends of the two telescoping horizontal members and secured thereto by suitable fastening means. Braces are provided at the bottom ends of adjacent pairs of legs for support. A similar sawhorse or support is disclosed in U.S. Pat. No. 3,148,746 issued on Sept. 15, 1964, to Juculano. The sawhorse disclosed in this patent has legs which are attached to a horizontal tubular member by means of hollow sleeves mounted at the top end of each leg. A chain is used to limit the outward swinging or extension of the adjacent legs. The use of a chain is also disclosed in U.S. Pat. No. 2,900,158 issued on Aug. 18, 1959, to Ditter.

III. Prior Art Statement

In the opinion of the applicant and applicant's attorney, the above-mentioned prior art represents the most relevant prior art of which applicant and applicant's attorney are aware.

SUMMARY OF THE INVENTION

The present invention, which will be described in greater detail hereinafter, comprises a collapsible horse for supporting lateral members, such as planks and the like, wherein the horse comprises a stringer and laterally opposite, downwardly divergent legs carried by each end portion of the stringer. The horse stringer comprises a first tubular member that has first and second legs attached to each end in such a manner that the legs and the first tubular member are disposed in the same plane. A second tubular member is telescopically received in the first tubular member and has a length that exceeds the length of the first tubular member by the width of a second pair of legs which are attached at the opposite ends of the second member after the second member has been telescopically received by the first member. A chain is attached to adjacent legs to limit outward swinging or extension of the legs of the sawhorse when it is in its unfolded, operative condition.

It is therefore a general object of the present invention to provide a horse for supporting lateral members, such as planks and the like, which is collapsible and therefore easily stored and transported. It is also an object of the present invention to provide a collapsible horse of the type described herein which is inexpensive and easy to manufacture, is light in weight, versatile, but also durable and of suitable strength.

Other objects, advantages and applications of the present invention will become apparent to those skilled in the art of sawhorses when the accompanying description of one example of the present invention is read in conjunction with the accompanying drawing.

BRIEF DESCRIPTION OF THE DRAWING

The description herein makes reference to the accompanying drawing wherein like reference numerals are used throughout the several figures to describe the present invention, and wherein.

DESCRIPTION OF THE PREFERRED EMBODIMENT

Figure 1:
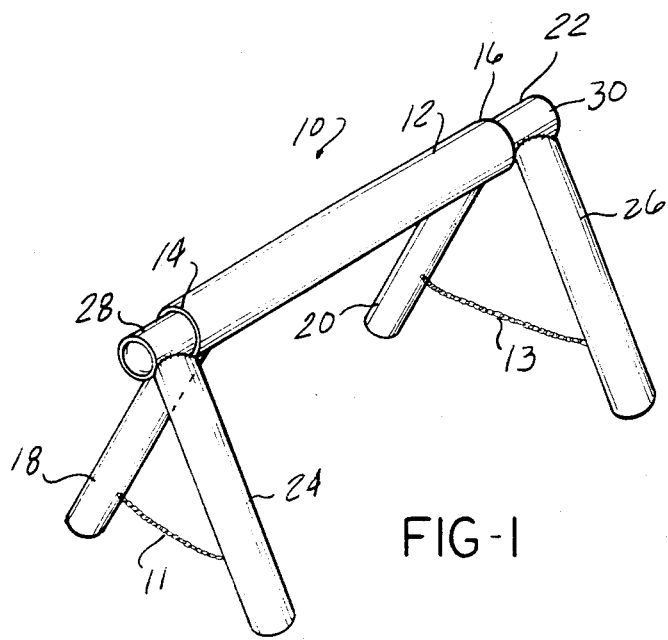
FIG. 1 is perspective view of a collapsible horse employing the principles of the present invention and shown in an unfolded or operative position.

Referring now to the drawing and, in particular, to FIG. 1 wherein there is illustrated one example of the present invention in the form of a collapsible horse 10. The collapsible horse 10 comprises an outer tubular member 12 which preferably has a round cross section and made of a durable and rugged material, such as steel or aluminum. The opposite ends 14 and 16 of the tubular member 12 have one end of a pair of downwardly extending legs 18 and 20 secured thereto. Attachment may be by any suitable means, such as brackets attached to the ends of the legs 18 and 20 or by welding as in the preferred embodiment. The legs 18 and 20 are secured to the opposite ends 14 and 16 of the tubular member 12 in such a manner that the legs 18 and 20 and the tubular member 12 lie in the same plane when so assembled. The legs 18 and 20 are similarly fabricated from a strong material, such as steel or aluminum.

The collapsible horse 10 further comprises an inner tubular member 22 which is adapted to be telescopically received by the tubular member 12 in a loose enough fit such that the tubular member 22 may be rotated a predetermined amount about its longitudinal axis, for a purpose which will be described hereinafter. Of particular importance is the length of the tubular member 22. As can best be seen in FIG. 1, the length of the tubular member 22 is greater than the length of the tubular member 12 and, preferably, by an amount which is equal to the width of the legs 24 and 26. The legs 24 and 26 are secured to the opposite ends 28 and 30 respectively of the tubular member 22. The legs 24 and 26 are attached to the tubular member 22 by any suitable means and preferably by welding. The tubular member 22 and the legs 24 and 26 are similar to the tubular member 12 in that they are fabricated from a suitable material having sufficient strength to carry the desired load. As with tubular member 12 and legs 18 and 20, this material may be steel or aluminum. The lower sections of the legs 18 and 24 are connected by a chain 11, while the lower legs 20 and 28 are similarly connected by a chain 13, the purpose of which will be described hereinafter.

Figure 3:
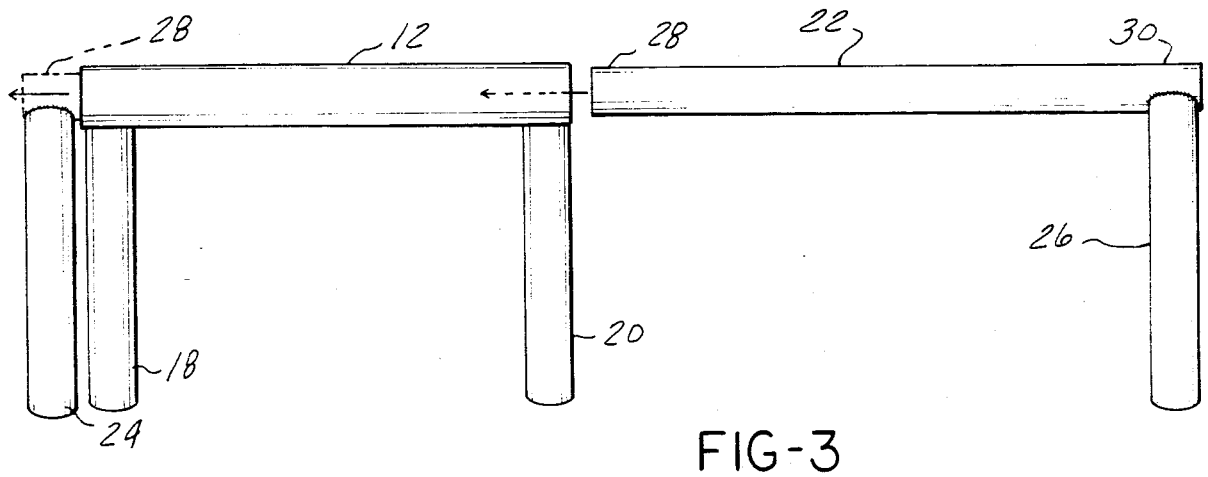
FIG. 3 is an exploded plan view of the horse of FIG. 1 illustrating the manner in which the horse is assembled.

During fabrication of the horse 10, the legs 18 and 20 are attached to the opposite ends 14 and 16, respectively, of the outer tubular member 12. As can best be seen in FIG. 3, only one leg (i.e. 26) is attached to one end of the tubular member 22 whereupon the other end, such as 28, is inserted through the tubular member 12 whereupon the remaining leg 24 is attached to the end 22. If desired, the tubular member 22 may be first inserted through the tubular member 12 and both legs 24 and 26 are then attached in a suitable manner to the opposite ends 28 and 30, respectively, of the tubular member 22. It is found through experience that it is best to fabricate the collapsible horse 10 by first attaching one leg to one end of the tubular member 22 before insertion of the tubular member 22 through the outer tubular member 12.

Figure 2:
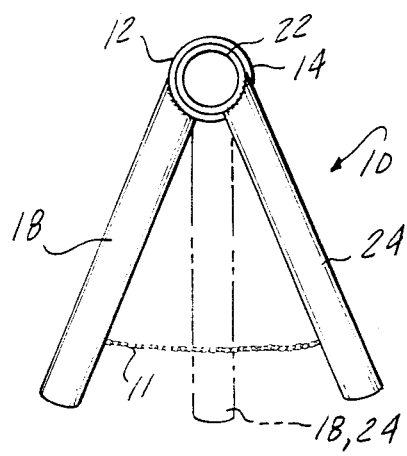
FIG. 2 is a left end view of the collapsible horse illustrated in FIG. 1.

It can thus be seen that when in an assembled condition the collapsible horse 10 is movable between a normal operative condition as illustrated in FIG. 1 in which the legs 18, 24 and 20, 26 at the opposite ends of the stringer defined by the tubular members 12 and 22 are in a downwardly divergent relationship, and a nonoperative or folded or collapsed condition in which the legs 18, 24 and 20, 26 are closed in a side-by-side relationship, as illustrated by the phantom lines in FIG. 2. This is accomplished because the legs 18 and 20 are attached to the outer tubular member 12 and lie in the same plane when so connected. Similarly, the legs 24 and 25 are attached to the inner tubular member 22 so as to all lie in the same plane when so secured. Since the tubular member 22 is of a greater length than the outer tubular member 12, rotation of the inner tubular member 22 about its longitudinal axis will permit mount of the legs of the respective members between the operative and collapsed positions. To limit divergent swinging of the legs 18, 24 and 20, 26 with respect to each other, chains 11 and 13 are provided. Suitable connections, such as nuts and bolts (not shown), provide a strong connection of the chains 11 and 13 to their respective legs.

In the foregoing description it is apparent that the present invention provides a light and inexpensive, yet sturdy, collapsible horse capable of supporting lateral members and the like, yet one which is adapted to be compactly folded and collapsed for storage and transportation, as desired.

It should also be apparent to those skilled in the art of sawhorses upon reading the specification that other forms of the invention fall within the scope of the appended claims.

What is claimed is as follows:

1. A collapsible horse for supporting lateral members, such as planks and the like, of the type comprising a stringer and laterally opposite, downwardly divergent legs carried by each end portion of the stringer, said collapsible horse comprising:
    a first tubular member comprising a portion of said stringer;
    first and second legs respectively carried at the opposite ends of said first tubular member and secured thereto such that said first tubular member and said first and second legs lie in the same plane when so secured;
    a second tubular member forming the remaining portion of said stringer and being telescopically received in said first tubular member and adapted to pivot about its longitudinal axis within said first tubular member;
    third and fourth legs respectively carried at the opposite ends of said second tubular member and secured thereto such that said second tubular member and said third and fourth legs lie in the same plane when so secured, the length of said second tubular member exceeding the length of said first tubular member by at least the width of said third and fourth legs, at least one of said third and fourth legs being secured to said second tubular member after it is telescopically received by said first tubular member to permit assembly of said second tubular member within said first tubular member, said legs being movable from a collapsed position wherein all of said legs lie in the same plane to an extended position wherein said legs are laterally spaced apart to form said horse in an operative position.

2. The collapsible horse defined in claim 1 further comprising means for limiting the outward divergence of said legs with respect to each other when said tubular members are rotated with respect to each other.

* * * * *